(12) United States Patent  
Mishima

(10) Patent No.: US 6,198,815 B1
(45) Date of Patent: *Mar. 6, 2001

(54) COMMUNICATION APPARATUS WITH STORED SETS OF DESTINATION AND COMMUNICATION MODE INFORMATION THAT AUTOMATICALLY SELECTS A STORED SET FOR A SECOND COMMUNICATION

(75) Inventor: Kenichi Mishima, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/280,139

(22) Filed: Jul. 25, 1994

Related U.S. Application Data

(63) Continuation of application No. 07/876,044, filed on Apr. 30, 1992, now abandoned.

(30) Foreign Application Priority Data

May 17, 1991 (JP) .................................................. 3-141465

(51) Int. Cl.[7] .................................................. H04M 1/00
(52) U.S. Cl. ............................................................ 379/355
(58) Field of Search ..................................... 379/355, 356, 379/100, 354; 358/440, 442, 444, 468

(56) References Cited

U.S. PATENT DOCUMENTS

| | | | |
|---|---|---|---|
| 4,764,951 | * | 8/1988 | Kotani .................................. 379/355 |
| 4,811,385 | | 3/1989 | Watanabe . |
| 4,847,891 | * | 7/1989 | Kotani .................................. 358/440 |
| 4,908,853 | * | 3/1990 | Matsumoto .......................... 379/354 |
| 4,910,506 | | 3/1990 | Yoshida et al. . |
| 4,985,918 | * | 1/1991 | Tanaka et al. ....................... 379/356 |
| 5,034,976 | * | 7/1991 | Sato ..................................... 379/355 |
| 5,095,445 | | 3/1992 | Sekiguchi . |
| 5,208,683 | * | 5/1993 | Okada .................................. 358/468 |

\* cited by examiner

*Primary Examiner*—Jack Criang
(74) *Attorney, Agent, or Firm*—Fitzpatrick, Cella, Harper & Scinto

(57) ABSTRACT

A communicating apparatus having a redial function comprises: an input unit to supply a destination and a communicating mode; a redial memory to sequentially store the destination and the communicating mode supplied by the input unit, in which a plurality of sets of destinations and communicating modes are stored into the redial memory; a communication unit to perform a communication to the destination supplied by the input unit in accordance with the supplied communicating mode; and a search key to search desired one of a plurality of sets of destinations and communicating modes which have sequentially been stored in the redial memory, wherein the communication unit executes the communication in accordance with the destination and the communicating mode according to the operation of the search key.

6 Claims, 4 Drawing Sheets

US 6,198,815 B1

COMMUNICATION APPARATUS WITH STORED SETS OF DESTINATION AND COMMUNICATION MODE INFORMATION THAT AUTOMATICALLY SELECTS A STORED SET FOR A SECOND COMMUNICATION

This application is a continuation of application Ser. No. 07/876,044 filed Apr. 30, 1992 now abandoned.

BACKGROUND OF THE INVENTION

1. Field of the Invention

The invention relates to a communicating apparatus having a redial function.

2. Related Background Art

Among conventional facsimile apparatuses or telephones, there is an apparatus such that when a call is generated, its destination is stored into a memory and, after that, when a redial key is depressed, the destination is read out from the memory and a call is again generated to the destination.

In the above conventional apparatus, however, since only one destination which can be redialed can be stored, when another person executes a transmission, the redial information is rewritten.

SUMMARY OF THE INVENTION

It is an object of the invention to improve the redial function.

Another object of the invention is to reduce a troublesomeness in setting of a communicating mode in the redialing operation.

Still another object of the invention is to provide a communicating apparatus in which each time a call is generated, the call generated telephone number and communicating mode are sequentially stored and the redial is performed by the telephone number according to the operation of a search key and a communication is executed in the communicating mode from a plurality of sets of telephone numbers and communicating modes stored.

The above and other objects and features of the present invention will become apparent from the following detailed description and the appended claims with reference to the accompanying drawings.

DETAILED DESCRIPTION OF THE PREFERRED EMBODIMENT

Figure 1:
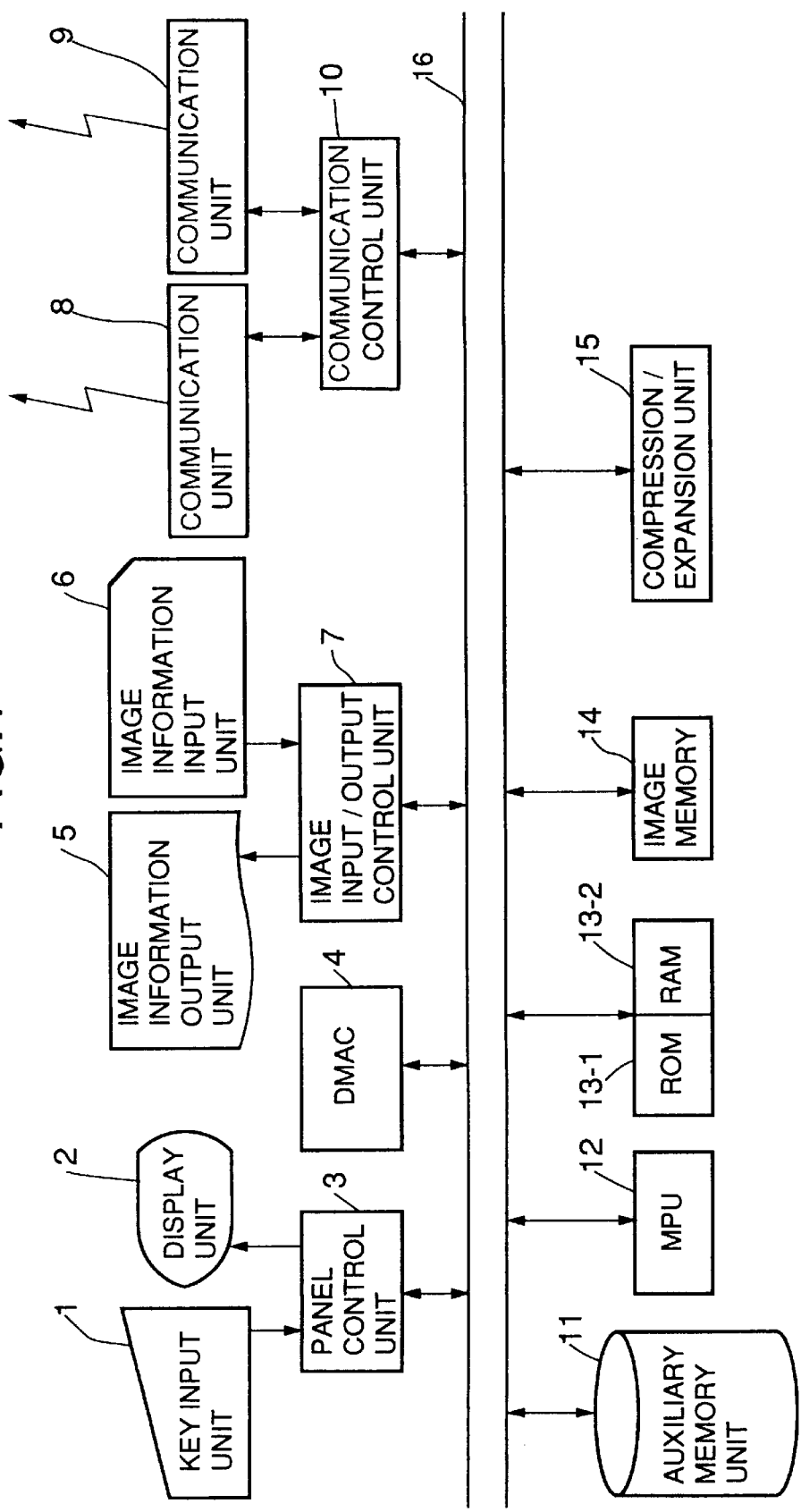
FIG. 1 is a block diagram of a facsimile apparatus embodying the present invention.

FIG. 1 is a block diagram showing a schematic construction of a facsimile apparatus embodying the present invention.

Figure 2:
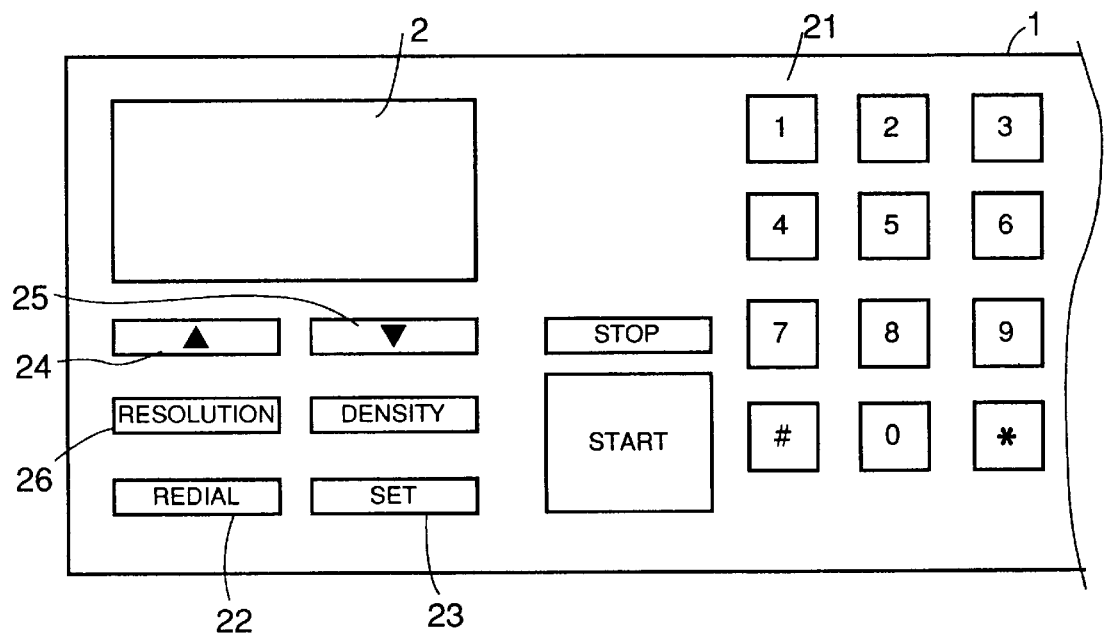
FIG. 2 is a plan view showing an operation panel of the facsimile apparatus shown in FIG. 1.

The facsimile apparatus has: a key input unit 1 having input keys to give various kinds of operation instructions and a facsimile number by the operation of an operator, a redial key, and the like; and a display unit 2 to display various messages or the like. The key input unit 1 and the display unit 2 are provided on an operation panel shown in FIG. 2 and are controlled by a panel control unit 3.

A DMA controller (DMAC) 4 controls a DMA transfer of image data or the like between, for example, an image input/output control unit 7 and an image memory 14.

An image information output unit 5 forms an image onto a recording medium on the basis of image information which is supplied through the image I/O control unit 7 and is constructed by, e.g., a laser beam printer or the like.

An image information input unit 6 gives image information of a digital signal by photoelectrically reading an original image and is constructed by, for instance, an image scanner or the like.

The image I/O control unit 7 performs an interface control among the image information output unit 5, the image information input unit 6, and a system bus 16 and controls the image information output unit 5 and the image information input unit 6.

Communication units 8 and 9 respectively perform communications through an analog line and a digital line. A communication control unit 10 controls the two communication units 8 and 9.

An auxiliary memory unit 11 is a large capacity memory unit such as a hard disk or the like to store compressed image information. An MPU 12 generates various data signals and control signals onto the system bus 16 in accordance with a control program stored in an ROM 13-1 or the like, thereby controlling the whole apparatus.

As mentioned above, the control program and various data are stored in the ROM 13-1. Various kinds of data are preserved in an RAM 13-2 and the RAM 13-2 is used as a work area of the MPU 12.

The image memory 14 stores the image data. A compression/expansion unit 15 compresses/expands the image information which is transmitted or received through the communication units 8 and 9.

In the embodiment, each time the image data is transmitted, the MPU 12 sequentially stores history information including the destination of the image data and the transmitting mode information into the RAM 13-2. In the redial transmitting operation, the MPU 12 reads out the history information selected by the operator from the history information stored in the RMA 13-2 in accordance with the operation of the key input unit 1 and executes the redial transmitting operation on the basis of the selected history information.

Figure 3:
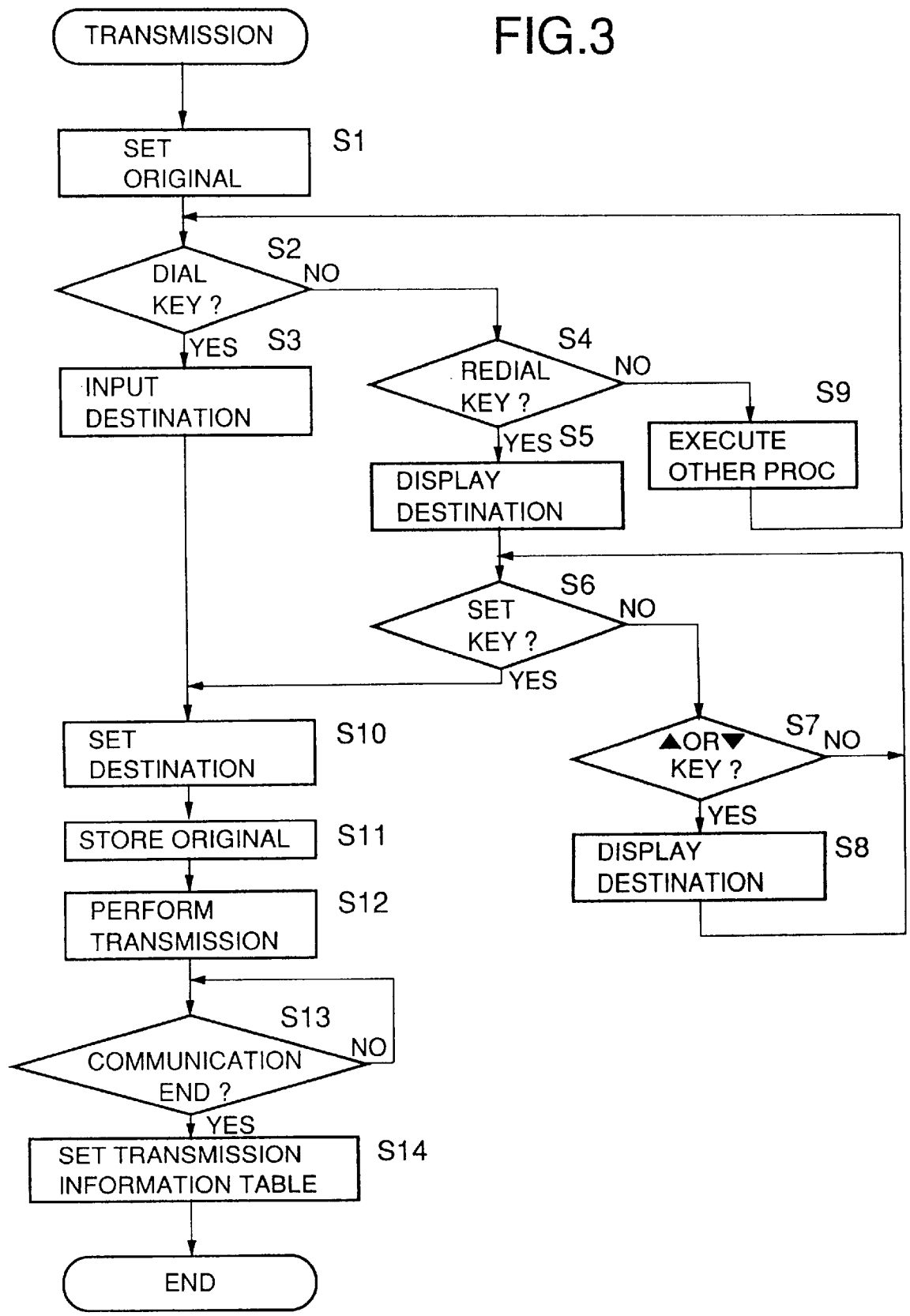
FIG. 3 is a flowchart showing processes in the transmitting mode of the facsimile apparatus shown in FIG. 1.

FIG. 3 is a flowchart showing processes in the transmitting mode of the embodiment.

First, the operator sets an original to the image information input unit 6 (step S1). The MPU 12 waits for the key input process from the key input unit 1. When there is a key input, a check is made to see if the input key is a dial key 21 or not (S2). In the case of the dial key 21, the information indicative of the input key is stored into a destination area in the RAM 13-2 (S3).

In the case of a key other than the dial key 21, the MPU 12 checks to see if the input key is a redial key 22 or not (S4). When it is the redial key 22, the information such as destination, paper size, resolution, and the like which have been transmitted in the past and have been held in the RAM 13-2 is displayed on the display unit 2 (S5). The MPU 12 subsequently checks to see if the input key is a set key 23 or not (S6). In the case of the set key 23, it is regarded that the selection of the information displayed in step S5 has been determined, so that the transmission information such as destination and the like is transferred to the communication control unit 10 (S10).

When the selection of the information displayed in step S5 is not determined, the MPU 12 searches a table in the RAM 13-2 in the case where a "▲" key 24 or a "▼" key 25 in the key input unit 1 is depressed (S7). The MPU 12 displays the content by the display unit 2 (S8) and waits for the input of the set key 23 (S6).

When the input key is not the redial key 22 in step S4, another key process, for instance, a process to set the resolution or the like by a resolution change key 26 is executed and the information indicative of the depressed key is stored into a predetermined area in the RAM 13-2 (S9).

The MPU 12 sets the transmission information such as destination and the like into a predetermined area in the RAM 13-2 (S10) and, thereafter, starts to read the original (S11). Thus, the image data is stored into the auxiliary memory unit 11 from the image information input unit 6 through the image I/O control unit 7.

A transmission processing routine follows and the original image in the auxiliary memory unit 11 is sent to the communication unit 8 or 9 through the communication control unit 10. The communication control unit 10 transmits the original image to the input destination in accordance with the communicating mode such as set resolution or the like (S12). The MPU 12 waits for the notification indicative of the end of communication from the communication control unit 10 (S13). When the MPU 12 receives the communication end notification, the MPU 12 writes the transmission information of the completed communication into a predetermined area in the RAM 13-2 and finishes the processing routine (S14).

Figure 4:
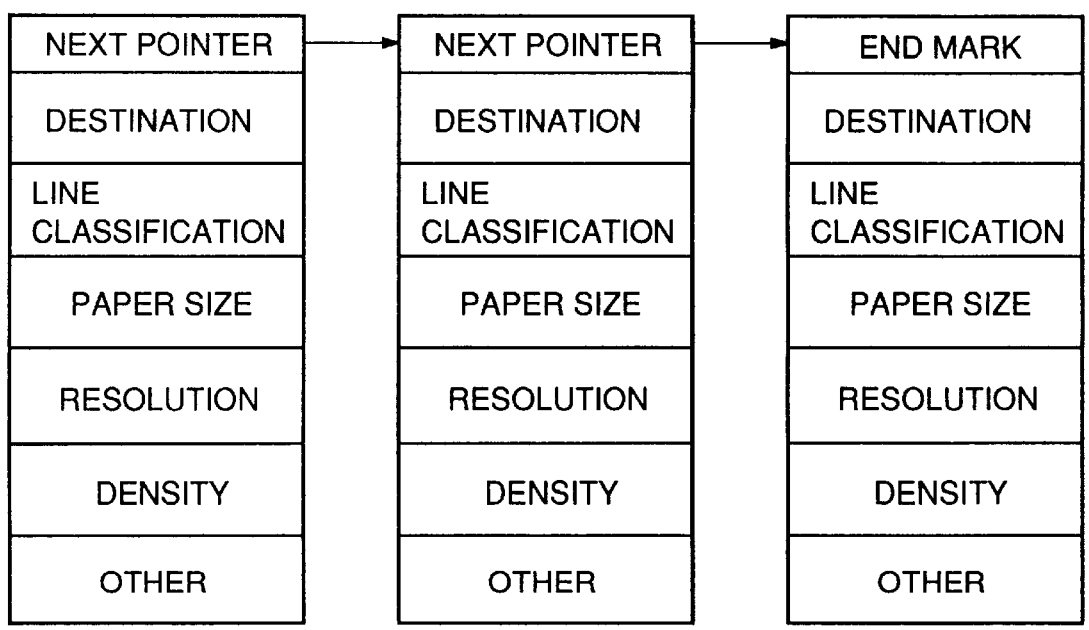
FIG. 4 is a schematic diagram showing a storing table of transmission information of the facsimile apparatus shown in FIG. 1.

FIG. 4 is a schematic diagram showing a stored table in the RAM 13-2 regarding the transmission information.

In the embodiment, the transmission information includes the transmission destination, line classification, paper size, resolution, density, and other information (for example, confidential transmission information, et.). Those communicating modes are given by the key input unit 1. The latest transmission information is stored in a state in which an end mark is added. The preceding transmission information is stored in a state in which a next pointer is added. The searching operation in step S7 is executed on the basis of the next pointer.

When the memory area of the transmission information is filled, the MPU 12 erases the stored transmission information from the oldest information.

In the embodiment, the information regarding the transmission is stored and searched by the redial key. However, it is also possible to construct in a manner such that the information about all of the operations is stored in addition to the transmission information and a desired operation is accessed by, for example, a dedicated history key and is executed. A series of processes can be also continuously executed. Further, the present history information can be also generated as a report.

Although the example in which the invention is applied to the facsimile apparatus has been described, the invention can be also applied to an ISDN data terminal. The ISDN data terminal embodying the invention stores a communicating speed and a data format as communicating modes into a predetermined area.

Although a preferred embodiment of the invention has been described above, the invention is not limited to the foregoing embodiment but many modifications and variations are possible within the spirit and scope of the appended claims of the invention.

What is claimed is:

1. A communication apparatus comprising:

an input unit, arranged to input destination information and a communication mode, the communication mode being one of a plurality of communication modes;

a communication unit, arranged to perform a communication in accordance with an inputted communication mode;

a re-dial memory that includes a plurality of memory areas, each of which stores re-dial information relating to an earlier communication performed by said apparatus, the re-dial information including destination information, a communication mode to be used for communicating with a destination corresponding to the destination information, and pointing data for pointing to a subsequently-stored memory area of the plurality of memory areas;

a display unit, arranged to display the re-dial information stored in each of the plurality of memory areas; and a selector unit, arranged to enable an operator to search for and select a desired one of the plurality of memory areas by viewing the re-dial information displayed by the display unit and designating a selection using said input unit, wherein the respective pointing data stored in each of the plurality of memory areas points to a memory area storing re-dial information of a next communication performed by said apparatus, the re-dial information stored in each of the plurality of memory areas are read out and displayed in an order opposite to an order in which they were stored in said re-dial memory, based on the pointing data stored in the plurality of memory areas, and said communication unit executes a communication in accordance with re-dial information stored in the desired one of the plurality of memory areas designated by the operator.

2. An apparatus according to claim 1, wherein said input unit includes a key input unit.

3. An apparatus according to claim 1, wherein the communication mode includes a resolution mode.

4. An apparatus according to claim 1, wherein the communication mode includes a line classification mode.

5. An apparatus according to claim 1, wherein said selector unit enables a user to search sequentially through the re-dial information stored in the plurality of memory areas using a scroll key of said input unit.

6. An apparatus according to claim 1, wherein said input unit includes a set key for designating that a selected re-dial information is set.

* * * * *

UNITED STATES PATENT AND TRADEMARK OFFICE
CERTIFICATE OF CORRECTION

PATENT NO. : 6,198,815 B1
DATED : March 6, 2001
INVENTOR(S) : Kenichi Mishima

It is certified that error appears in the above-identified patent and that said Letters Patent is hereby corrected as shown below:

Title page,
Item [56], References Cited, U.S. PATENT DOCUMENTS, insert -- 4,907,094 3/1990 Mishima et al. --.

Column 3,
Line 41, "et.)." should read -- etc.). --.

Signed and Sealed this

Twenty-fifth Day of December, 2001

Attest:

JAMES E. ROGAN
*Attesting Officer*   *Director of the United States Patent and Trademark Office*